Nov. 26, 1940.      E. B. MALLORY      2,223,258
SEWAGE PURIFICATION APPARATUS
Filed March 28, 1938      4 Sheets-Sheet 1
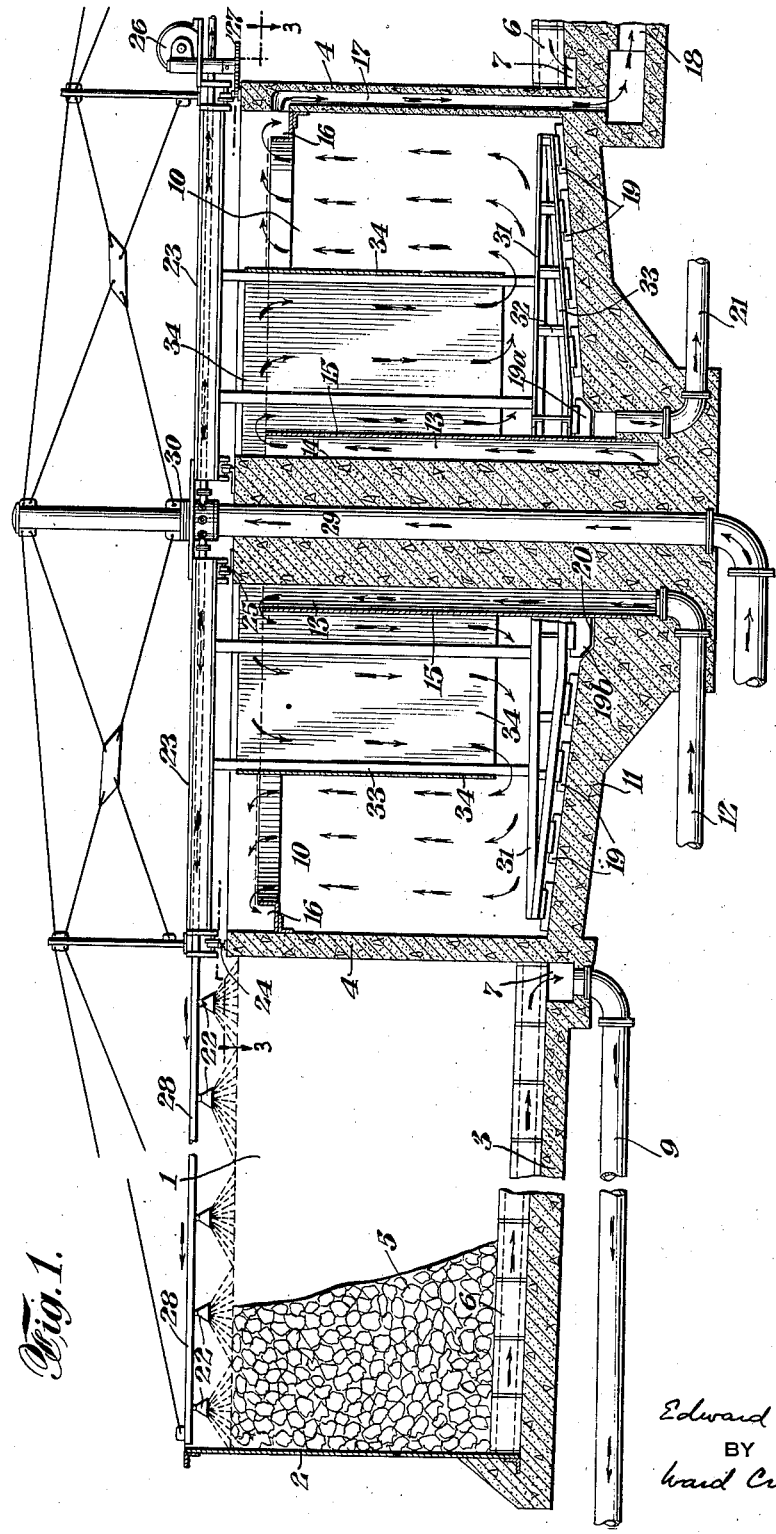
INVENTOR
Edward B. Mallory
BY
Ward Crosby & Neal
ATTORNEYS

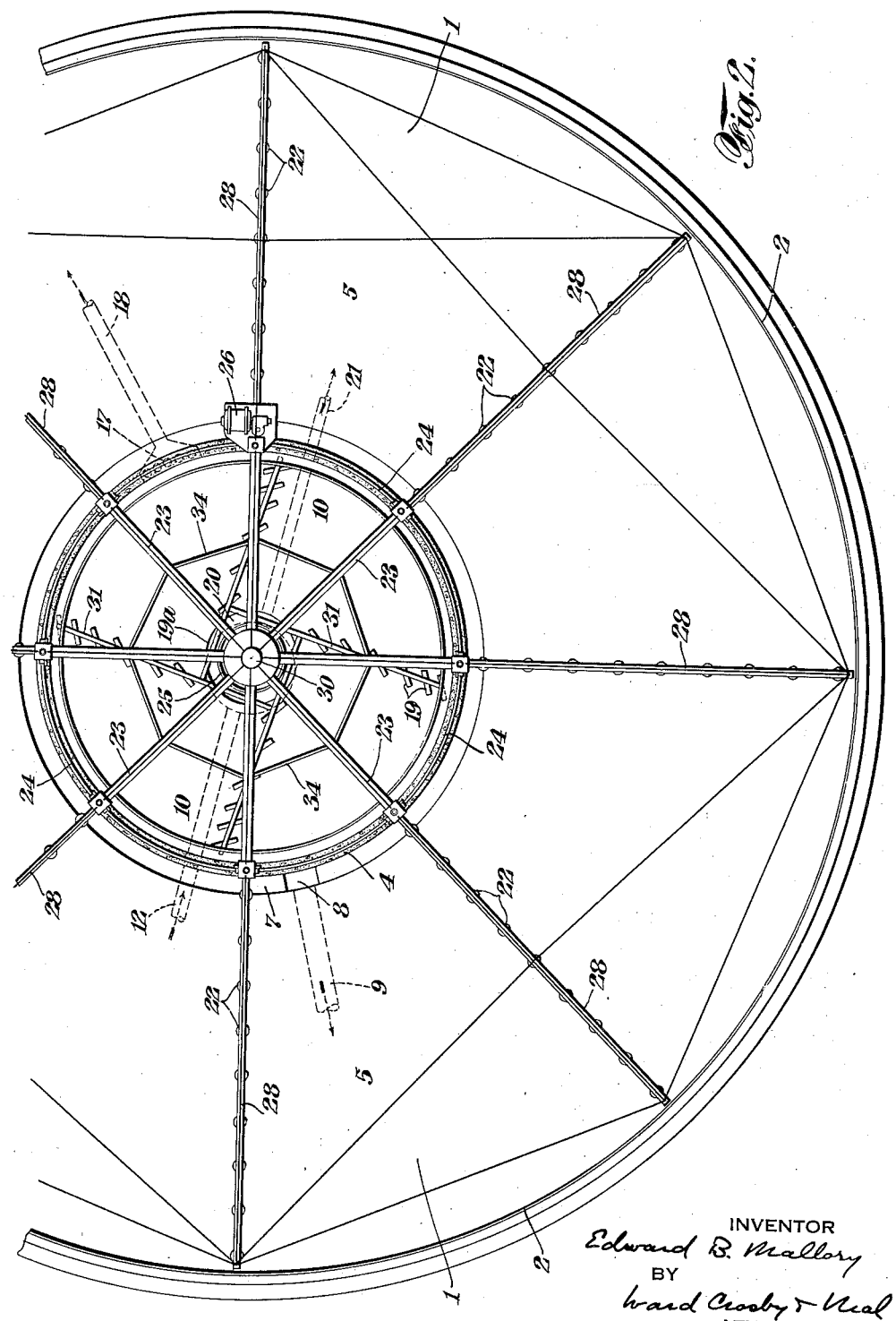

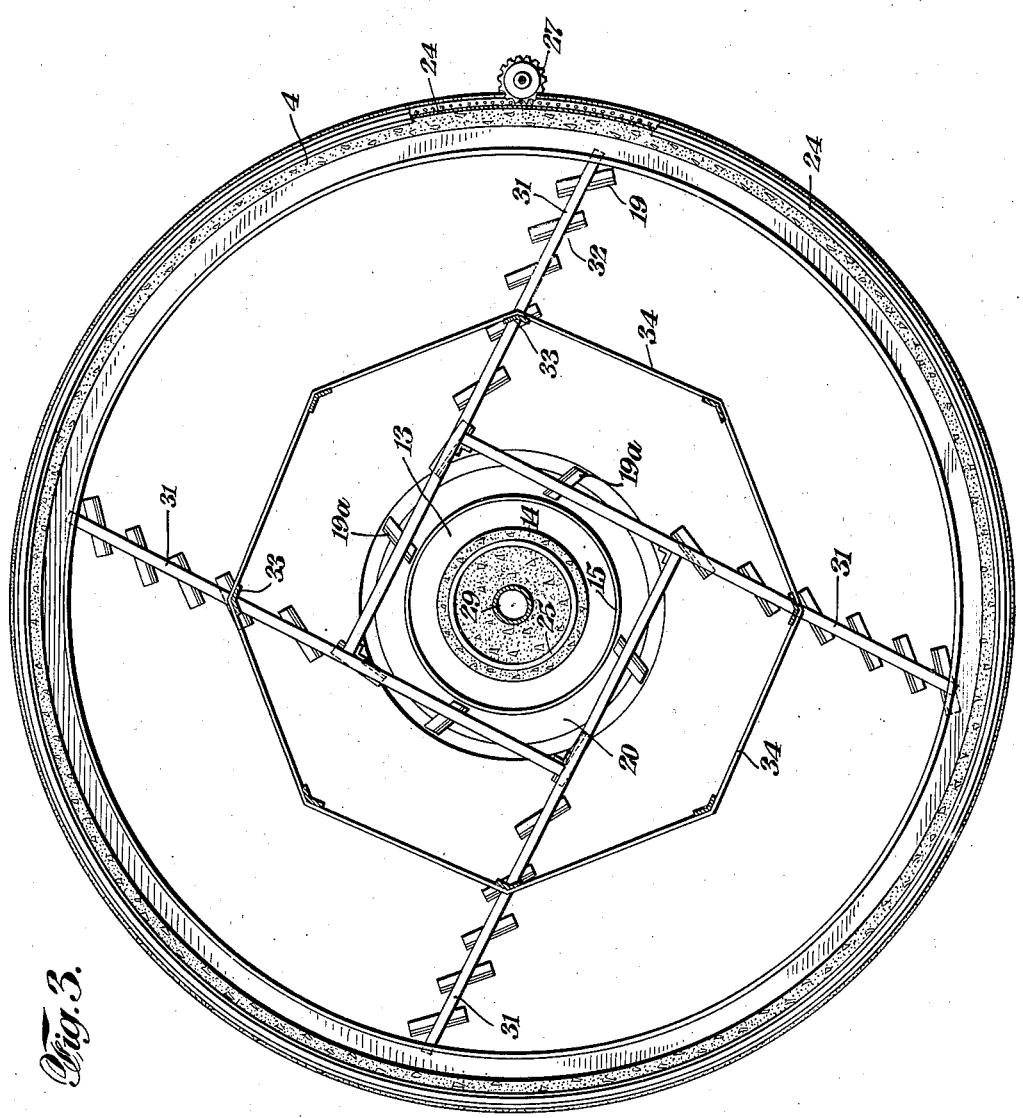

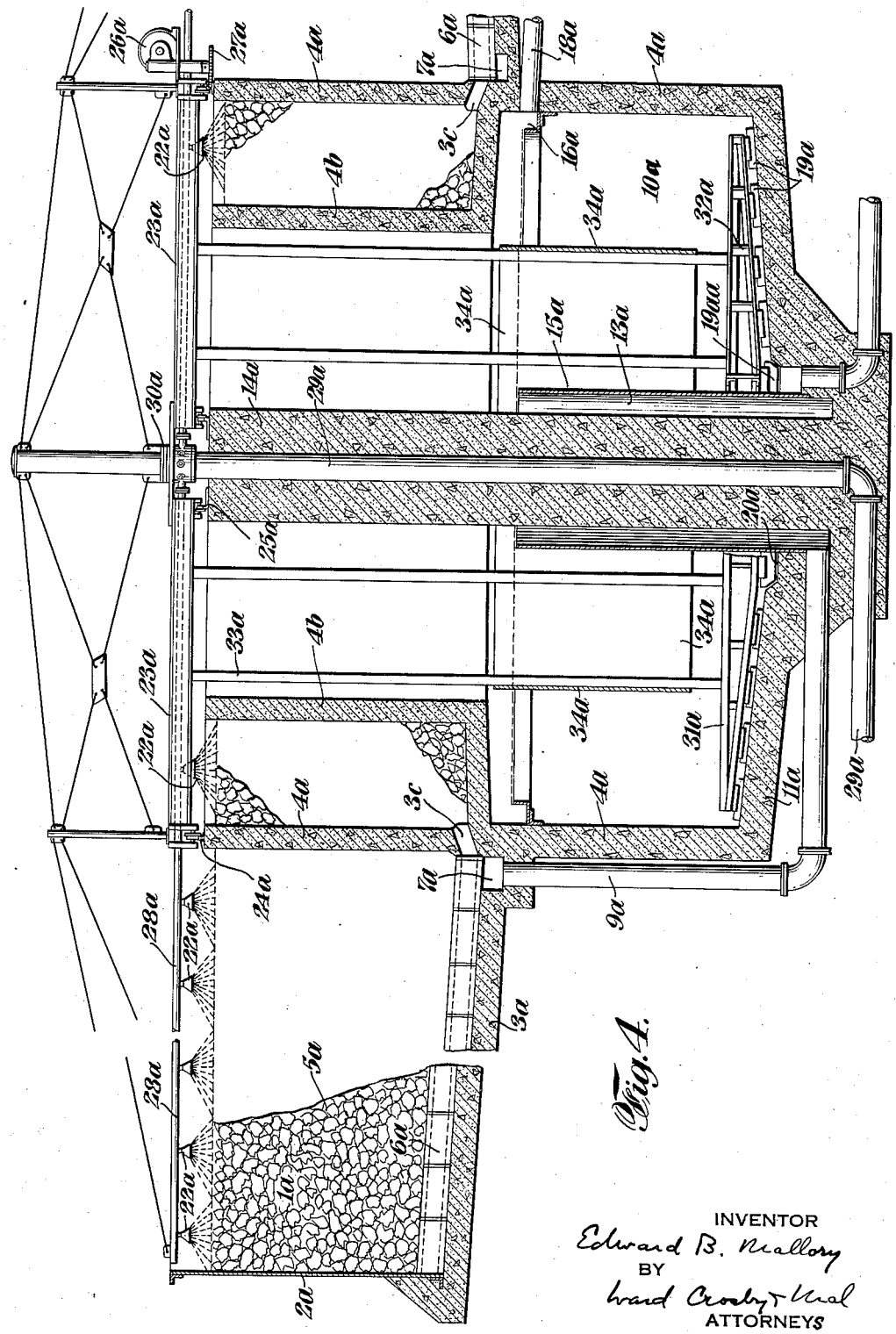

Patented Nov. 26, 1940

2,223,258

UNITED STATES PATENT OFFICE 2,223,258

SEWAGE PURIFICATION APPARATUS

Edward B. Mallory, Tenafly, N. J.

Application March 28, 1938, Serial No. 198,395

5 Claims. (Cl. 210—7)

Apparatus for the purification of sewage and analogous waste liquors has been known for many years, involving the use of so-called percolating or trickling filters, which act as aerators or oxidizing devices, in conjunction with clarifying or settling chambers to which the aerated and oxidized filtrate was conducted and in which the entrained solids settled and were removed from the bottom of the clarifying chamber, clarified effluent being drawn off from the top of the clarifier. In apparatus of the above character, it is frequently desirable to use certain moving members in connection with both the percolating filter and the clarifier, such as a moving distributor for spraying the incoming sewage fairly uniformly over the top surface of the filter, and a sludge collecting mechanism moving through the bottom of the clarifier to collect or remove the sludge therefrom.

The present invention aims to provide a purification apparatus of the above described character wherein the filtering and clarifying chambers are so coordinated with respect to each other and with respect to a common mechanism for supporting and driving the above mentioned moving members, as to markedly reduce the amount and expense of such supporting and driving mechanisms as well as the operating cost thereof, provide efficient paths of flow for the liquids and solids passing through the apparatus in regard to completeness of treatment and entailed hydraulic head losses, and also reduce very materially the ground area required for such an apparatus of given capacity. Further objects and advantages of the invention will be in part obvious and in part specifically referred to in the description hereinafter contained which, taken in conjunction with the accompanying drawings, illustrates certain preferred forms of apparatus suitable for use in carrying out the invention; in the broader aspects of the invention however such disclosure should be considered as merely illustrative of its principles. In the drawings—

Fig. 1 is a vertical section of an apparatus constructed in accordance with the invention.

Fig. 2 is a plan view, with a portion thereof cut away, of the apparatus shown in Fig. 1.

Fig. 3 is a section on line 3—3 of Fig. 1 looking in the direction of the arrows.

Fig. 4 is a view similar to Fig. 1 but illustrating an apparatus somewhat modified in construction.

In the form of apparatus illustrated in Figs. 1 to 3, an annular aerating and oxidizing chamber 1 of the so-called percolating or trickling type is constituted by a circular or approximately circular outer side wall 2, a floor 3, and an inner side wall 4 which is substantially concentric with the outer wall 2. The chamber 1 may be understood as filled with suitable aggregate 5 through which the waste liquors to be treated percolate, as known in the art, and a suitable number of underdrains 6 consisting of hollow tiles or the like, may be provided along the floor 3 to assist in conducting the aerated liquor to an annular outlet chamber 7 surrounding wall 4 and communicating with aerated liquor effluent conduit 9.

The clarifying chamber 10 is enclosed by and substantially concentric with the aerating chamber 1 above described, and wall 4 above described may serve in whole or in part as the outer wall of the clarifier, which latter in the form of the invention under discussion is provided with a floor 11 sloping downwardly toward the center of the apparatus. Aerated liquor from the filtering chamber 1 is fed into the clarifying chamber 10, and preferably to the central portion thereof. As shown in Fig. 1 the aerated liquor may be fed from pipe 12 (to which the aerated liquor may be fed from conduit 9 by a suitable pump not illustrated) into one or more passageways 13 surrounding a central supporting pillar 14 and enclosed by an upstanding shell or tube 15 spaced from pillar 14. The solids contained within the aerated liquor are caused to settle out to form a sludge blanket in the bottom of the clarifying chamber 10, and purified effluent is conducted off from the upper portion of the chamber. As shown in Fig. 1, an annular weir 16 may be provided at the top peripheral portion of the clarifying chamber in such manner that the purified effluent flows over this weir into one or more effluent conduits 17 extending downwardly in or adjacent the wall 4 previously described, to an effluent offtake conduit 18 which passes outwardly under the aerating chamber and thence to the receiving waters of the region.

In conjunction with the clarifying chamber 10 it is desirable to provide angularly movable sludge collecting or raking members 19 which assist in removing the sludge from the bottom of the clarifier. In the form of the invention under discussion these members 19 rotate about the central pillar 14 as an axis and progressively stroke the sludge inwardly toward the central sump 20 which surrounds shell 15, and the sludge is taken off through an outlet pipe 21. The particular mechanism above described should be understood as merely illustrative of devices known and used for sludge collection or removal.

Angularly movable distributors are also used in connection with the filtering chamber 1 to distribute the sewage to be treated, fairly uniformly over the top of the filtering bed 5. As shown these distributors take the form of spray nozzles 22 and in accordance with the present invention a common supporting structure overlying both of the chambers 1 and 10 serves to support and drive both the sludge collecting members 19 and distributor members 22. This supporting structure in the illustrative form is provided with a plurality of beams 23 radiating outwardly from the central portion of the apparatus, these beams being rotatably mounted on circular tracks 24 and 25 carried respectively by wall 4 and central supporting pillar 14, and the common supporting structure constituted by the beams 23 and associated parts hereinafter described, may be caused to rotate concentrically with respect to the chambers 1 and 10, by means of a suitable motor 26 and associated gearing 27, which latter mechanism will not be described in detail since suitable forms thereof are known in the art.

In the illustrated form of the invention the distributor members 22 are mounted on radially extending pipes 28, these pipes being in turn carried by the beams 23 above described. Incoming sewage to be treated is fed through an intake conduit 29 leading upwardly through the central portion of the apparatus and communicating with a header 30 carried by the supporting structure above mentioned. This header 30 in turn communicates with the inner ends of the several pipes 28.

The sludge collecting members 19 may be suspended from the beams 23 through intermediate connecting and bracing members, such as the horizontal beams 31 (Fig. 1) located respectively above members 19 and connected thereto by short vertical angle pieces 32 and horizontal pieces 33 (Fig. 1), the inner end portions of the beams 31 being joined together so as to surround the central pillar 8 as shown in Fig. 2. These inner portions may also carry supplementary sludge moving members 19a operating in the sump 20 as shown in Fig. 1. The structure constituted by the beams 31 above described may be suspended from the beams 23 by means of angle shaped uprights 33 (Figs. 1 and 3) connected to the beams 31 at their lower ends and respectively to the beams 23 at their upper ends. Thus the uprights 33 in conjunction with the horizontal beams 31 make up a relatively strong and well braced structure through which rotary motion may be imparted to the sludge moving members 19 and 19a.

I also prefer to provide an annular curtain wall 34 which projects down in to the clarifier 10 and surrounds the central portion thereof so as to divide the clarifier chamber into inner and outer compartments communicating at the bottom of the clarifier chamber. In a construction of the character above described, this curtain wall may be readily provided by fastening steel plates to the uprights 33, these plates in the illustrated form of the invention extending down nearly to the level of the horizontal beams 31. It should be understood that the word "annular" where it appears in this specification is used in a broad or loose sense to include shapes which approach circular form, although they may be polygonal as the shape of the illustrated curtain wall 34. This curtain wall 34 thus rotates with the supporting structure, and causes the filtrate fed in through passageway 13 to pass downwardly in the central portion of the clarifier chamber toward the sludge blanket located in the bottom thereof, the solid particles being filtered out in the sludge blanket, and the purified liquid passing up to the outer portion of the clarifier chamber to flow over the annular weir 16.

Suitable tie-rods may also be used to interconnect the various overhead members making up the above described supporting structure as shown more particularly in Figs. 1 and 2, but such details of the apparatus will not be specifically described.

In Fig. 4 I have shown a somewhat modified form of apparatus wherein the aerating and oxidizing chamber 1a is located at a higher level than the clarifying chamber 10a, in such manner that aerated liquor from chamber 1a flows by gravity through conduit 9a to the intake passageway 13a of clarifier 10a. The parts numbered 1a, 9a, 13a, etc., of Fig. 4 are in general similar in function to the parts 1, 9, 13, etc., above described in connection with Figs. 1 to 3, and accordingly detailed description of the numbered elements in Fig. 4 will not be given except in certain instances where further comment appears to be in order.

In the apparatus of Fig. 4 the aerating and clarifying chambers are concentric with each other, or substantially so, whereby a common supporting structure angularly movable about the common central axis of the chambers, may be used to carry and move with it the distributors 22a overlying chamber 1a and the sludge collecting members 19a and 20a in chamber 10a. The supporting structure overlies the two chambers in the sense that it extends to a level high enough to enable the moving operating members to be attached thereto, but in this embodiment of the invention one chamber need not surround the other. In Fig. 4 for example, the aerating chamber 1a may have in addition to the wall 4a, or as a substitute therefor, an inner wall 4b surrounding the uprights 33a and overlying the clarifying chamber 10a, wall 4b being supported by an overhanging extension 3b of floor 3a, and passageways 3c leading through wall 4a to the outlet chamber 7a. The passageways 3c if desired may be in the form of relatively large archways spaced around the periphery of wall 4a, so as to interpose between them portions of the wall 4a which act as supporting columns to carry the weight of the rotating mechanism on track 24a. In such an installation the aerating chamber 1a may be above ground level and the chamber 10a sunk wholly or in part within the ground. The space within wall 4b will afford access to chamber 10a for repairs or adjustments.

The concentric relationship of the percolating filter and clarifier as above described, markedly reduces the ground area required for an apparatus of given capacity as well as the initial cost thereof. Simplification and lower initial costs as well as operating costs may also be obtained in respect to the moving operating parts used in the filter and clarifier, by virtue of the common supporting and driving structure as above set forth, and the path of travel of the sewage in passing through the apparatus is short and direct, reducing hydraulic head losses, and promoting efficiency of purification.

While the invention has been disclosed as carried out by means of a particular form of apparatus, it should be understood that many changes may be made therein without departing from the invention in its broader aspects, within the scope of the appended claims.

I claim:

1. Sewage purification apparatus of the class described, including a clarifying chamber, an aerating chamber of the percolating type, means for conducting aerated liquor from the aerating chamber to the clarifying chamber, one of said chambers being substantially annular in shape and surrounding the other, the side walls of both of said chambers being substantially symmetrically disposed about a common central axis, a supporting structure overlying both of said chambers, means mounting said supporting structure for angular movement about an axis substantially coincident with the above mentioned common central axis, sludge collecting members disposed in the lower portion of said clarifying chamber, and an influent distributor overlying said aerating chamber, said sludge collecting members and distributor being both attached to and movable with said supporting structure.

2. Sewage purification apparatus of the class described, including a clarifying chamber, an aerating chamber of the percolating type substantially annular in cross section and surrounding said clarifying chamber, the side walls of both of said chambers being substantially symmetrically disposed about a common central axis, means for conducting aerated liquor from the aerating chamber to the clarifying chamber, a supporting structure overlying both of said chambers, means mounting said supporting structure for angular movement about an axis substantially coincident with the above mentioned common central axis, sludge collecting members located in the lower portion of said clarifying chamber, said members being attached to and movable with said supporting structure, and an influent distributor overlying said aerating chamber, said distributor being also attached to and movable with said supporting structure.

3. Sewage purification apparatus of the class described, including a clarifying chamber, an aerating chamber of the percolating type substantially annular in cross section and surrounding said clarifying chamber, the side walls of both of said chambers being substantially symmetrically disposed about a common central axis, means for conducting aerated liquor from the aerating chamber to the clarifying chamber, a supporting structure overlying both of said chambers, means mounting said supporting structure for angular movement about an axis substantially coincident with the above mentioned common central axis, sludge collecting members located in the lower portion of said clarifying chamber, said members being attached to and movable with said supporting structure, and an influent distributor overlying said aerating chamber, said distributor being also attached to and movable with said supporting structure, and an influent supply conduit extending upwardly through the central portion of said clarifying chamber into communication with said influent distributor.

4. Sewage purification apparatus of the class described, including a clarifying chamber, an aerating chamber of the percolating type, said aerating and clarifying chambers having their walls disposed substantially symmetrically with respect to a common central axis, means for conducting aerated liquor from the aerating chamber to the clarifying chamber, a supporting structure having means mounting said structure for angular movement substantially concentric with the aforesaid central axis, sludge collecting members located in the lower portion of said clarifying chamber, said members being attached to and movable with said supporting structure, and an influent distributor overlying said aerating chamber, said distributor being also attached to and movable with said supporting structure.

5. Sewage purification apparatus of the class described, including a clarifying chamber, an aerating chamber of the percolating type substantially annular in cross section and surrounding said clarifying chamber, the side walls of both of said chambers being substantially symmetrically disposed about a common central axis, means for conducting aerated liquor from the aerating chamber to the clarifying chamber, a supporting structure overlying both of said chambers, means mounting said supporting structure for angular movement about an axis substantially coincident with the above mentioned common central axis, sludge collecting members located in the lower portion of said clarifying chamber, said members being attached to and movable with said supporting structure, and an influent distributor overlying said aerating chamber, said distributor being also attached to and movable with said supporting structure, a central supporting pillar for said supporting structure, said pillar extending upwardly through the central portion of said clarifying chamber, and an influent supply conduit extending upwardly through said pillar into communication with said influent distributor.

EDWARD B. MALLORY.